US005220633A

United States Patent [19]

Selinger

[11] Patent Number: 5,220,633

[45] Date of Patent: Jun. 15, 1993

[54] OPTICALLY EFFECTIVE MATERIAL AND METHOD FOR THE MANUFACTURE THEREOF

[76] Inventor: Viktor Selinger, Unterdorf 97, 9633 Hemberg-SG, Switzerland

[21] Appl. No.: 789,203

[22] Filed: Nov. 12, 1991

[30] Foreign Application Priority Data

Nov. 12, 1990 [CH] Switzerland ........................ 4035965

[51] Int. Cl.[5] ........................ G02B 6/00; G04B 35/44

[52] U.S. Cl. ........................ 385/147; 501/86

[58] Field of Search ........................ 385/147; 501/86

[56] References Cited

U.S. PATENT DOCUMENTS 4,030,317 6/1977 Rogell ........................ 501/86 X 4,042,673 8/1977 Strong ........................ 501/86 X 4,608,307 8/1986 Nakano et al. ........................ 501/86 X 4,621,065 11/1986 Isogami et al. ........................ 501/86 X

*Primary Examiner*—Akm E. Ullah

*Attorney, Agent, or Firm*—ELGI International

[57] ABSTRACT

The invention relates to an optically effective material and a method for the manufacture thereof, having at least one element which can be arranged in and/or on a support, said at least one element being adapted to be arranged as desired in and/or on the support and being arranged optically in three-dimensionally effective manner. The element before adjustment of its position in and/or on the support is so varied that it assumes for itself an optically three-dimensional shape.

14 Claims, 1 Drawing Sheet

OPTICALLY EFFECTIVE MATERIAL AND METHOD FOR THE MANUFACTURE THEREOF

BACKGROUND OF THE INVENTION

1. Field of Invention

The present invention relates to an optically effective material and a method for manufacturing it.

Such optically effective materials are preferably used as low-cost imitations of structures of semi-precious stones. These materials, however, can also be used for the erection of construction works as optically striking and aesthetically pleasing structural parts.

Insects or similarly optically attractive elements are frequently cast in acrylic-glass articles. Their quasi three-dimensional arrangement in the acrylic glass article permits the complete physical representation of such element.

2. DESCRIPTION OF RELATED ART

From Federal Republic of Germany Patent 35 33 463 it is known to imitate natural structures by arranging transparent effect layers, properly fitted, one above the other. In this connection, the effect layers are arranged and developed in a manner similar to the natural structure to be imitated. In addition to the agreement in the appearance, the three-dimensional effect of the natural structure is also imitated. This agreement is produced, in particular, by the three-dimensional arrangement of the layers.

Since the effect layers are flat and arranged one above the other, they have optical normals of incidence directed in the same direction. Incident light accordingly is always refracted at approximately the same angle. This means, however, that a different optical impression of the imitated natural structure can only be obtained if the position of the source of light and/or of the effect material and/or the observer is changed.

SUMMARY OF THE INVENTION

The object of the present invention is to improve the optical effect of traditional optically effective materials. This object is achieved in the case of an optical material of this type and in a method of this type for the manufacture of the optically effective material. In this connection, the element may be chemically or physically modified three-dimensionally before it is arranged, for instance, in or on the support, i.e. is adapted to the conditions established by this support.

The three-dimensionally effectively modified element produces a double three-dimensional effect in a support. On the one hand, it gives a three-dimensional effect greater than the prior art due to the arrangement as desired of the elements in the support. On the other hand, the element in itself has a three-dimensional effect. The basic prerequisite for obtaining such a three-dimensional effect is, of course, a difference in the optical properties—for instance, the indices of refraction—of support and element. This layer, sheet or film-like element preferably has relief-like contours within the support. The depthwise effect upon the viewing of three-dimensionally appearing natural substances can, thereby, be imitated in a surprisingly similar fashion. In the case of color effects, as a result the three-dimensional optical additional effects there can also be obtained other effects than upon the customary viewing of a colored surface which is identifiable from the standard color table. The element can, of course, also be an intentionally produced defect or gap in the support and it can, however, also itself have defects. All states of aggregation are conceivable for material, support and element. The character of the surface is to be adapted in each case to the corresponding requirements. Since the elements may be of any dimensions, industrial manufacture in practically unlimited extent is possible.

The element advantageously has surface sections having at least two normals to the surface aligned in a manner not parallel to each other. In this way, the eye of the observer does not receive light only from a preferred direction of incidence. Rather differently directed normals to the surface and accordingly differently directed optical incidence normals produce a large number of different refractions. The different sections of the element are individualized quasi-optically, i.e. each section is a separate system of refraction in itself. In this way, the three-dimensional effect of the changed element is increased in physically known manner. The viewer is afforded an intense depth-wise effect. At the same time, the individualization also, however, has the result that not only light impinging at a given angle on the element is observed. The probability of refraction on an incidence normal of any element section is increased. This is advantageous, in particular, in the case of objects—such as, for instance, so-called "cat's eyes" or reflectors on bicycles—the function of which depends on reflection of incident light. In accordance with the invention, the light need not strike at a preferred angle. Practically all directions of incidence are possible. In the case of "cat's eyes", the incident light is reflected in all directions, in accordance with the invention.

In particularly preferred manner, the element has portions with surfaces inclined differently to each other. They are produced automatically upon differently strong external action of force on the film-like element. From a machine standpoint, such surfaces are preferably produced, for instance, by means of the so-called embossing process or also the vacuum process.

DESCRIPTION OF THE PREFERRED EMBODIMENTS

In one particularly preferred embodiment of the material in accordance with the invention, the element has surfaces with portions of different shape. In this way, a change in the intensity of the refracted light can be obtained on the element as a function of the impingement portion. A curvature of the element produces, for instance, an optically dispersing or collecting action.

The element is preferably optically iridescent. It is particularly preferred if the element is partially reflecting, partially transmitting and/or absorbing. If light rays pass through a first element and strike against another element below the first element, then a partial reflection takes place here also. The light reflected by the second element can pass again through the upper first element and contribute there again to the formation of interference. An individual color impression is the result. The color impression is intensified if elements arranged one above the other produce approximately identical optical images. This is true, for instance, when surfaces of the elements are aligned quasi-parallel to each other with respect to the passage of the light. In cooperation with the three-dimensional arrangement, color effects can be obtained which could not be achieved up to now in equal purity. In particular, these color effects produce an optical appearance which is extremely similar to the precious stone opal.

In a particularly preferred embodiment of the material of the invention, there is present between the element and the support substance a protective layer which prevents reaction between support substance and element. In particular, when acrylic is used there are frequently undesired reactions in contact with other materials. As a result, substances present, for instance, in an acrylic support, i.e. elements, can be dissolved or swell. The adherence of the different materials to each other is reduced and may even be entirely lost.

By means of the protective layer of the invention, undesired reactions between element and support, or else reduction or elimination of adherence existing between them, can be excluded. It is self-evident that also element and support without use of a protective layer can be selected in such a manner that undesired reactions or adherence problems are excluded from the very start.

The protective layer, support or element can be a photopolymer having the ability of hardening under the action of UV radiation. As protective layer, support or element, there are, however, also conceivable, for instance, solvent-containing lacquers, solvent-free lacquer, and two component systems which polymerize under the action of UV light, catalysts or heat, etc. Copolymers or mixtures of systems, etc. can also be used.

It is particularly preferred if the protective layer is, in particular, flame retarding or self-extinguishing. This is advantageous in particular when using the optically effective material as structural or decorative element if the danger of a fire is to be minimized. Even if a part of the optically effective material should burn, the protective layer can prevent the burning of the remaining protected part of the material. Of course, supports or elements may also be flame-retarding or self-extinguishing, whereby the danger of a fire can be completely excluded.

In order to obtain particularly attractive effects, the materials used can also be colored as desired. The coloring can, of course, be effected by means of powdered stone, metal or plants, colored earths or sand or chemically, for instance, by pigments, liquid-crystal phases, fluorescent substances or else physically by vapor deposition possibly with metal oxides, interference colors or waveguides, etc.

The film-like element is preferably a rainbow film. Such films—consisting of a plurality of light-permeable plastic layers—can be easily manufactured and are available everywhere. A rainbow film, when exposed to light under a given angle of incidence, produces an opalescent effect based on different refraction of given wavelengths.

It is particularly preferred if the element is a continuous layer and/or a waveguide. If the above-mentioned layer is used between two identical materials, it serves essentially as optical medium with index of refraction different from the rest of the material. The relief-like development of the layer contributes again to the double three-dimensional effect in accordance with the invention. The layer can also easily be coated with light-pervious plastic, preferably on both sides. This composition produces the optical effect in accordance with the invention and has the advantage that it can be used with extreme flexibility as semi-finished product wherever the essential requirement made on the optically effective material is its flexibility.

In another preferred embodiment, the bottom surface or at least one side surface of the material has an optically non-transmitting layer. Radiation can thus not escape the optically effective material after passage. For the film-like elements there is thus created a background contrast which intensifies the optically three-dimensional effect of the optically effective material. The optically non-transmitting layer can be produced merely by coloring the already existing material or else by, for instance, providing an additional separate layer.

In another preferred embodiment of the material, the support is a support substance which maintains a relative equilibrium position of the at least one element in the material. A rigid crystalline solid-body structure of the material for the viewer can be assured in this way.

In one advantageous method, the originally smooth surface of the film-like element can, inter alia, be varied by application of compression and/or tension or a torsional force. In this way, the required structure of the desired final state of the film-like element can be fixed. The changes can be effected mechanically as well as manually.

Finally, in another embodiment of the method of the invention, the optically effective material is cut and reassembled in desired fashion. By change of the lamination, the three-dimensional impression of the optically effective material can be intensified. At the same time, other optical phenomena, such as, for instance, pictures, letters or objects, can be arranged between the cut planes. In this way, it is possible to combine the three-dimensional effects of the optically effective material simultaneously with means of information.

For finishing the optically effective material is preferably polished on its surface. Suitable finishing methods are, for instance, the polyurethane bonding technique with glass, anti-static coating, "no drop" coating, coating by plasma polymerization, silk screen printing, and scratch-proof coatings, etc.

Residues of the optically effective material which are not further used may advantageously be ground in drum grinding machines and vibrators to form so-called "pebbles" shaped or polished further or coated differently depending on their use. These "pebbles" combine excellently, for instance, with acrylic blends, recycled acrylic of any size, color or transparency, which can also be worked with the above method.

DESCRIPTION OF THE DRAWING

One embodiment of the invention is shown in the drawings and will be described in further detail below. In the drawing.

The construction and possibly also the effect of the invention will be described below with reference to the drawings.

Figure 1:
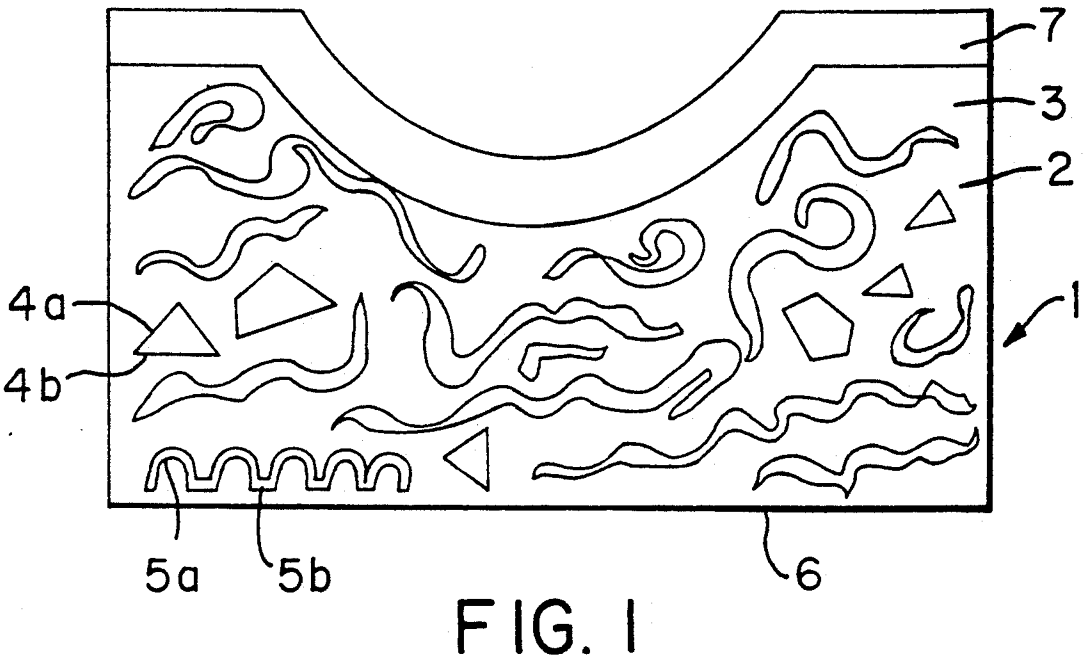
FIG. 1 is a cross section through the optically effective material of the invention.

FIG. 1 shows a finished optically effective material 1. It is produced in the following manner:

First of all, a mold (not shown) is placed in a water bath. A still unhardened epoxy resin 3 is introduced into said mold up to a predetermined height.

A film-like element 2, for instance, in the form of a rainbow film, is worked outside the mold into pieces of desired size. The rainbow film pieces 2 thus obtained are thereupon subjected to an external force. In this connection, they can be turned, compressed or pulled or have their surface treated in any other manner. The treatment is intended merely to produce surface sections 4a, 4b of different inclination to each other or else surface sections 5a, 5b of different shape. As a function of the number of different surfaces of the rainbow film pieces 2, there are obtained a correspondingly large number of optical normals of the most different direction. The number of different preferred directions of reflection or transmission for incident light is directly proportional to the number of differently directed optical normals.

Preferably, after the machining, the rainbow film pieces 2 are placed on the surface of the still unhardened epoxy resin 3 or introduced into it. The rainbow film pieces 2 can, however, also be changed in their structure only after arrangement in the epoxy resin 3.

Once a desired rainbow film piece 2 has been introduced into the epoxy resin 3 and fixed in its position as a result of the hardening of the epoxy resin 3, a further layer of liquid epoxy resin 3 can be poured into the mold. This further epoxy resin 3 also again receives rainbow film pieces 2 on its surface. After hardening, the process of incorporation of rainbow film pieces 2 in the epoxy resin 3 can be repeated step-by-step.

Of course, the desired mold can also be initially filled completely with epoxy resin 3. The preworked rainbow film pieces 2 are then arranged in still unhardened condition of the epoxy resin 3 in the desired position, for instance by means of pincers. After hardening, the pieces 2 are fixed in position.

Instead of the epoxy resin 3, silicone, glass, acrylic, oils or aqueous substances can, for instance, also be used. The selection of the support 3 is effected from the standpoint of the color desired and/or the index of refraction desired. When aqueous substances are used as support 3, the weight of the film-like elements 2 determines their position.

When the hardening process of the epoxy resin 3 has terminated, the material 1 can be removed from the mold. In order to increase the three-dimensional effect, the bottom and/or side surfaces can be provided with an absorptive paint. The light falling into the material 1 is thus not passed through.

In order to be able to use the material 1 as structural element, part of ordinary objects of use, or as artistic object, the surface is additionally finished. This finishing is effected by the applying of a glass 7 onto the surface of the material 1 which appears on the outside, or possibly by polishing this surface. This surface can also be lacquered.

Figure 2:
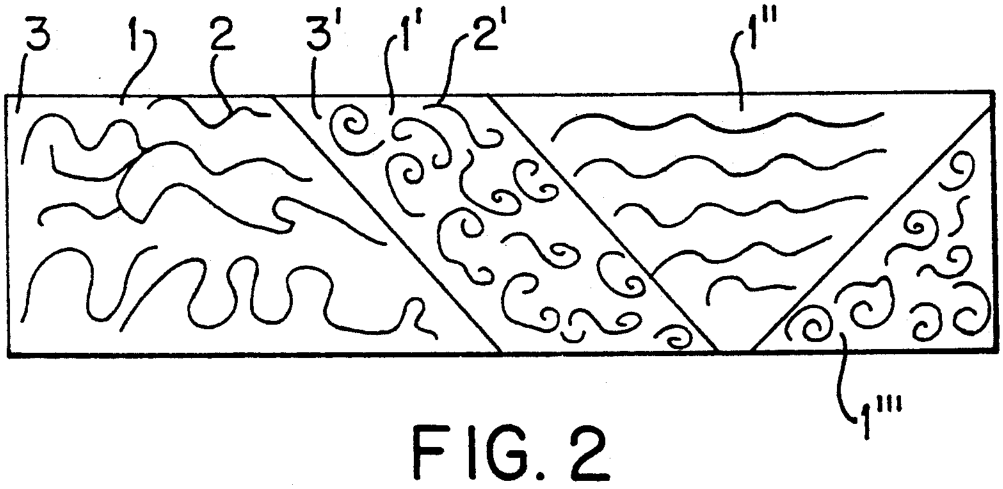
FIG. 2 is a cross section through the cut and reassembled optically effective material in accordance with the invention.

FIG. 2 shows a structural part assembled from cut optically effective material 1, 1', 1'', 1'''. First of all, individual optically effective materials 1, 1', 1'', 1''' are prepared for this in the manner previously explained. After hardening, they are cut. The parts thus produced can then be combined as desired with one another. The combining is effected by placing the parts on the corresponding cut planes. In this way, even different support substances of different color or indices of refraction can be combined with each other. It is also possible to use film-like elements 2 or 2' which cannot be included, for instance, for chemical reasons in the corresponding other support substance 3, 3'.

Between the cut planes, pictures or similar receivable objects can advantageously also be arranged. This assures use of the optical structural element as means of communication.

In the following, a method of production for the optically effective material, as described previously in principle with reference to the drawings, will be further explained:

First of all, a tubular body of approximately U-shape is arranged on a horizontal plate of glass. Another plate of glass is then placed on top of the tubular body. Clamps arranged on the side along the outer periphery of the plates of glass produce a sealing connection between the plates of glass and the tubular body. The inside defined by the tubular body between the plates of glass is accessible only from one side, namely via the opening between the two leg ends. Thus, the structure referred to as casting, which consists of glass plates and tubular body, forms a pocket.

The casting is now placed upright in such a manner that the pocket formed is open towards the top.

An inherently stable film provided with a protective lacquer is introduced into this pocket from above. There- upon the pocket is filled with pre-polymerized acrylic. If air bubbles are produced upon the filling, they are preferably removed by a vacuum. One leg section of the tubular U-shaped body is extended in such a manner that it protrudes out of the molding. The protruding section is now carefully placed over the open edge of the composition present in the mold, namely the molding composition, in such a manner that no air bubbles remain in the molding composition. By adjustment of the aforementioned clamps, the elimination of air bubbles can be substantially favored.

In the final condition, the previously protruding section of the tubular body as well as the other end of the tubular body lie alongside of each other, as seen from above. The seal between them is effected by a suitable cement. Clamps are thereupon applied also at the place of the cement and, therefore, then exert the required pressure on the two glass plates also at this point.

The entire mold is then introduced horizontally into a preheated water bath. The final polymerization of the prepolymerized acrylic is effected thereby. The duration of this process depends on various factors, for example the thickness of the molding composition.

After the molding composition has been fully polymerized and converted into a solid shaped body, the entire mold is heated in an air circulation oven until no stresses or migrations need be feared any longer. After this procedure, the final molding is removed from the mold and used as such or as semi-finished product for further processing.

This semi-finished product can be used as a core for injection moldings. It is also possible to produce the optically effective material by injection molding. In this case, it is of particular advantage that the injection molding molds already contain certain articles and the optically effective material adapts itself rapidly to these shapes. In this way, in particular the speed and, thus, the economy of the process of manufacture are optimized. Of course, extrusion, co-extrusion, coating processes, etc. can also be used as methods of manufacturing the optically effective material.

I claim:

1. An optically effective material, comprising: a support having optical properties, the support and the material having at least one different optical property; and at least one element having one of a layer-like, sheet-like and film-like form, said at least one element being arranged at least one of in and on the support in a desired configuration relative to the support and being varied in a three-dimensionally effective manner.

2. The material of claim 1, wherein the at least one element has surface sections with at least two surface normals which are not aligned parallel to each other.

3. The material of claim 1, wherein the at least one element has surfaces with sections that are inclined differently to each other.

4. The material of claim 1, wherein the at least one element has surfaces with sections of different shape.

5. The material of claim 1, wherein the at least one element is optically iridescent.

6. The material of claim 1, wherein the at least one element is at least one of partially reflecting, partially transmitting and partially absorbent.

7. The material of claim 1, wherein a protective layer is arranged between the at least one element and the support so as to prevent reaction between the support and the at least one, the protective layer being one of flame-retarding and self-extinguishing.

8. The material of claim 7, wherein the at least one element is a rainbow film.

9. The material of claim 6, wherein the at least one element is at least one of a continuous layer and a wave-guide.

10. The material of claim 1, wherein the at least one element has a bottom surface and side surfaces, an optically non-transmitting layer being provided on at least one of the bottom surface and at least one side surface.

11. The material of claim 1, wherein the support is made of a substance which maintains a relative position of equilibrium of said at least one element in the material.

12. A method for manufacturing an optically effective material, comprising the steps of: providing a support material;

constructing at least one element in the form of one of a layer, a sheet and a film;

working the at least one element so that it assumes for itself an optically three-dimensional shape;

arranging the at least one element at least one of in and on the support material; and adjusting the position of the at least one element in and on the support.

13. The method of claim 12, wherein the element constructing step includes constructing the element with a surface that can be varied by applying at least one of compression, tension and torsion.

14. The method of claim 12, comprising the further steps of cutting the optically effective material and reassembling the material in any desired manner.

* * * * *